US011389835B2

(12) United States Patent
Nowicki et al.

(10) Patent No.: US 11,389,835 B2
(45) Date of Patent: Jul. 19, 2022

(54) SORTER PERFORMANCE MONITORING METHOD AND SYSTEM

(71) Applicant: Dematic Corp., Grand Rapids, MI (US)

(72) Inventors: Daniel J. Nowicki, Belmont, MI (US); Randall J. Carlson, Grand Rapids, MI (US); James R. VanOeffelen, Holland, MI (US); Martin J. Stanish, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 0 days.

(21) Appl. No.: 17/003,168

(22) Filed: Aug. 26, 2020

(65) Prior Publication Data

US 2020/0384507 A1 Dec. 10, 2020

Related U.S. Application Data

(62) Division of application No. 16/040,860, filed on Jul. 20, 2018, now Pat. No. 10,786,832.
(Continued)

(51) Int. Cl.
*B65G 47/84* (2006.01)
*B07C 5/36* (2006.01)
*B65G 43/00* (2006.01)

(52) U.S. Cl.
CPC ............ *B07C 5/361* (2013.01); *B65G 43/00* (2013.01); *B65G 47/844* (2013.01)

(58) Field of Classification Search
CPC ......... B07C 5/361; B07C 5/362; B65G 43/00; B65G 47/52; B65G 47/841; B65G 47/844
(Continued)

(56) References Cited

U.S. PATENT DOCUMENTS 5,641,054 A * 6/1997 Mori ................. H01L 21/67184
198/465.1
6,784,572 B1  8/2004 Backman et al.
(Continued)

FOREIGN PATENT DOCUMENTS

EP    3070029 A1    9/2016
EP    3392405 A1 * 10/2018  ........... D21G 9/0009
(Continued)

OTHER PUBLICATIONS

Search Report of the European Patent Office from corresponding European Application No. 18838929.0, indicated completed on Mar. 9, 2021.
(Continued)

*Primary Examiner* — Terrell H Matthews
(74) *Attorney, Agent, or Firm* — Gardner, Linn, Burkhart & Ondersma LLP

(57) ABSTRACT

A method of sorting articles with a sorter apparatus and a sorter apparatus having a conveying surface that is adapted to transport articles in a direction of conveyance and a mechanism adapted to displace articles on the conveying surface, the sorter apparatus having an endless web of bodies travelling in an endless loop defining the conveying surface includes a distributed drive system having at least one drive that is adapted to produce to provide force with at least one of the bodies to propel the endless web. A diagnostic device traveling with the web and positioned at one of the bodies of the endless web. The diagnostic device is adapted to monitor operation of the sorter apparatus and includes at least one sensor that is adapted to detect at least one parameter of a proximate drive that is proximate to the at least one sensor, and a controller adapted to receive the at least one parameter from the at least one sensor. A stationary thermal sensor may also monitor the endless loop via another controller including receiving thermal data from the stationary thermal
(Continued)

sensor and the another controller correlates the thermal images with a portion of the endless loop.

20 Claims, 13 Drawing Sheets

Related U.S. Application Data

(60) Provisional application No. 62/537,100, filed on Jul. 26, 2017.

(58) Field of Classification Search
USPC .......................................................... 209/653
See application file for complete search history.

(56) References Cited

U.S. PATENT DOCUMENTS

| | | | | |
|---|---|---|---|---|
| 7,240,781 B2* | 7/2007 | Ramaker | ................. | B07C 5/362 |
| | | | | 198/370.13 |
| 7,580,772 B2* | 8/2009 | Stolyar | ................... | B07C 3/082 |
| | | | | 209/584 |
| 8,260,574 B1 | 9/2012 | Schuitema et al. | | |
| 8,469,177 B2* | 6/2013 | Steenwyk | ............. | B65G 47/844 |
| | | | | 198/370.02 |
| 9,227,791 B2 | 1/2016 | DePaso | | |
| 2002/0096417 A1 | 7/2002 | Veit et al. | | |
| 2002/0185358 A1* | 12/2002 | Zeitler | ................... | B65G 47/52 |
| | | | | 700/223 |
| 2003/0132143 A1* | 7/2003 | Cochran | .............. | B65G 47/844 |
| | | | | 209/916 |
| 2012/0145500 A1 | 6/2012 | Staunton et al. | | |
| 2014/0263777 A1* | 9/2014 | Anderson, Jr. | ......... | B02C 25/00 |
| | | | | 241/34 |

FOREIGN PATENT DOCUMENTS

| | | |
|---|---|---|
| JP | H1-303230 A | 12/1989 |
| JP | H6-189414 A | 7/1994 |
| JP | H09290914 A | 11/1997 |
| WO | WO-2019021139 A1 * | 1/2019 ............. B07C 5/361 |

OTHER PUBLICATIONS

International Search Report and Written Opinion of the International Searching Authority from corresponding Patent Cooperation Treaty (PCT) Application No. PCT/IB2018/55435, dated Nov. 15, 2018.

* cited by examiner

SORTER PERFORMANCE MONITORING METHOD AND SYSTEM

CROSS REFERENCE TO RELATED APPLICATIONS

The present application is a divisional of U.S. patent application Ser. No. 16/040,860, filed Jul. 20, 2018, which claims priority benefit of U.S. provisional application Ser. No. 62/537,100, filed Jul. 26, 2017, the contents of which are incorporated herein by reference.

BACKGROUND OF THE INVENTION

The present invention pertains to a sorter apparatus and method and, in particular, to a technique for evaluating the sorter apparatus, including, but not limited to, determining defects in the sorter apparatus and predicting maintenance needs. The invention can be applied to positive displacement shoe and slat sorters, automated storage and retrieval systems, cross-belt sorters, and the like.

Sorter apparatuses tend to be very large systems. In the case of positive displacement shoe and slat sorters, by way of example, the conveying surface can extend for hundreds of feet or more. If the sorter apparatus goes out of specification, it may not be immediately apparent to a maintenance technician, and it may be difficult to determine with precision where a condition exists that, if uncorrected, may result in long-term downtime to the sorter apparatus.

SUMMARY OF THE INVENTION

The present invention provides a sorter apparatus having a unique diagnostic device that is useful for ongoing monitoring of sorter performance and method of diagnosing or providing long-term evaluation of the sorter apparatus. Embodiments of the invention are capable of predicting maintenance needs of the sorter apparatus with minimal downtime, as the sorter apparatus can be permanently equipped with the diagnostic device and operate continuously with it installed.

A method of sorting articles with a sorter apparatus and a sorter apparatus having a conveying surface that is adapted to transport articles in a direction of conveyance and a mechanism adapted to displace articles on the conveying surface, the sorter apparatus having an endless web of bodies travelling in an endless loop defining the conveying surface, according to an aspect of the invention, includes a distributed drive system having at least one drive that is adapted to produce to provide force with at least one of the bodies to propel the endless web. A diagnostic device travels with the web and is positioned at one of the bodies of the endless web. The diagnostic device is adapted to monitor operation of the sorter apparatus and includes at least one sensor that is adapted to detect at least one parameter of a proximate drive that is proximate to the at least one sensor, and a controller adapted to receive the at least one parameter from the at least one sensor.

The distributed drive system may includes a linear motor system and the at least one drive comprises at least one stationary linear motor primary that is adapted to produce a magnetic field to provide force in a linear motor secondary with one of the bodies to propel the endless web. The at least one parameter may include a distance between the at least one sensor and the proximate linear motor primary and/or a temperature of the proximate linear motor primary. The diagnostic device may further include an inductive pickup that is adapted to receive power through electromagnetic induction from the magnetic field produced by the proximate linear motor primary and to provide the received power to the diagnostic device. The diagnostic device may further include a wireless interface module that is adapted to receive data from the controller and wirelessly transmit the data to a remote receiver.

The at least one sensor may include an acceleration sensor that is adapted to detect the acceleration sensor travels with the endless web. The at least one sensor may include a magnetism sensor adapted to detect magnetic fields surrounding the magnetism sensor as the magnetism sensor travels with the endless web. The sorter apparatus may include at least one stationary surface that is adjacent a lateral edge portion of the endless web of bodies and wherein the at least one sensor further include a distance sensor adapted to measuring a distance between the distance sensor and the at least one stationary surface and positioned at an end of one of the bodies. The bodies may be slats.

A method of sorting articles with a sorter apparatus and sorter apparatus having a conveying surface adapted to transport articles in a direction of conveyance and a mechanism to displace articles on the conveying surface, the sorter apparatus having an endless web of bodies travelling in an endless loop defining the conveying surface, according to an aspect of the invention, includes a diagnostic device travelling with the web and positioned at one of the bodies of the endless web. The diagnostic device is adapted to monitor operation of the sorter apparatus and includes at least one sensor, a controller, and a wireless interface module. The sensor is adapted to detect diagnostic data of operation of the sorter apparatus. The controller is adapted to receive diagnostic data from the at least one sensor. The wireless interface module is adapted to receive diagnostic data from the controller and wirelessly transmit the diagnostic data to a remote receiver. An energy harvesting device at the endless web is adapted to wirelessly receive electrical power and supply electrical power to the diagnostic device.

The energy harvesting device may be adapted to convert movement of the endless web to electrical power. The endless web may be propelled by at least one linear motor primary that is adapted to produce a magnetic field to provide force to propel the endless web and wherein the energy harvesting device may include an inductive pickup adapted to receive power through electromagnetic induction from the magnetic field produced by the at least one linear motor primary. The diagnostic device may include an acceleration sensor, an inertial sensor, a temperature sensor, a distance sensor, and/or a magnetic field sensor.

At least one stationary surface may be adjacent a lateral edge portion of the endless web of bodies and wherein the at least one sensor may further include a distance sensor adapted to measuring a distance between the distance sensor and the at least one stationary surface and positioned at an end of one of the bodies. The at least one sensor may include at least one temperature sensor, wherein the at least one temperature sensor measures at least one of a temperature of the nearby linear motor primary or a temperature of the temperature sensor. The wireless interface module uses Wi-Fi to wirelessly transmit the diagnostic data to a remote receiver.

The remote receiver may be adapted to analyze received diagnostic data and identify a possible fault condition. The possible fault condition may be identified based at least in part on a comparison of the received diagnostic data to at least one of a corresponding threshold or to historical data. The diagnostic device may further include a data storage module, wherein the diagnostic data is stored with the data storage module until the wireless interface module wirelessly transmits the diagnostic data to the remote receiver. The bodies may be made from extruded metal and wherein the wireless interface module further includes an antenna positioned adjacent an end of one of the bodies to reduce the body becoming a Faraday shield to the antenna.

A method of sorting articles with a sorter apparatus and sorter apparatus having a conveying surface that is adapted to transport articles in a direction of conveyance and a mechanism adapted to displace articles on the conveying surface, the sorter apparatus having an endless web of bodies travelling in an endless loop defining the conveying surface, according to an aspect of the invention, includes a distributed drive system having at least one stationary drive that is adapted to produce to provide force with at least one of the bodies to propel the endless web. A thermal hotspot detection system includes a diagnostic device traveling with the web and a stationary thermal sensor. The diagnostic device is positioned at one of the bodies of the endless web and is adapted to monitoring operation of the sorter apparatus and having at least one sensor adapted to detect a temperature parameter of a proximate drive that is proximate to the at least one sensor, and a controller adapted to receive the at least one temperature parameter from the at least one sensor. The stationary thermal sensor monitors the endless loop and is operative with another controller that is adapted to receive thermal data from the stationary thermal sensor and correlate the thermal images with a portion of the endless loop.

The stationary thermal sensor may include a thermal imaging sensor and the other controller may determine which one or ones of the bodies correlate with any thermal image identifying a thermal hot spot. The endless loop may be supported at opposite lateral end portions and the stationary thermal sensor may be directed at the lateral end portions of the endless loop.

The distributed drive system may include at least one stationary linear motor primary that is adapted to produce a magnetic field to provide force in a linear motor secondary with one of the bodies to propel the endless web. The at least one sensor further may further sense a distance between the at least one sensor and the proximate linear motor primary.

These and other objects, advantages, and features of this invention will become apparent upon review of the following specification in conjunction with the drawings.

DESCRIPTION OF THE PREFERRED EMBODIMENT

Figure 1:
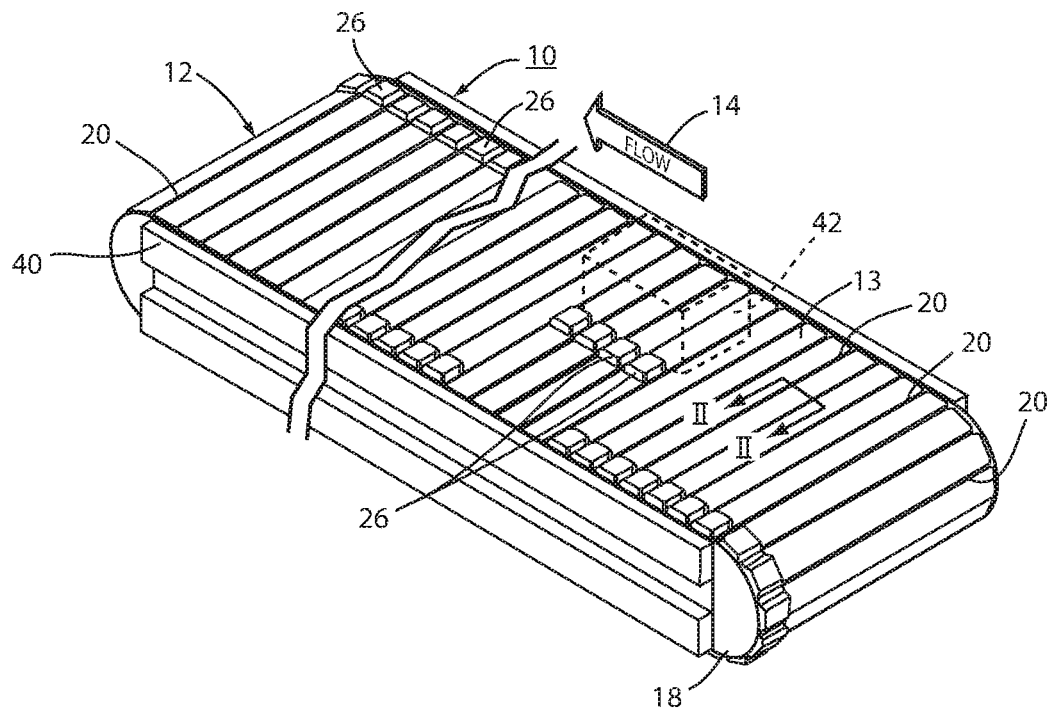
FIG. 1 is a perspective view of a sorter apparatus according to one embodiment.

Referring now to the drawings and the illustrative embodiments depicted therein, a sorter apparatus 10 includes a conveying surface 22 adapted to transport a plurality of articles 24 in a direction of conveyance 14. In the embodiment shown in FIG. 1, sorter apparatus 10 is a positive displacement sorter, although it will be understood that other types of sorter apparatuses may be used in accordance with the present teachings, such as, but not limited to, carousel-type sorters such as tilt-tray sorters and cross-belt sorters, automated storage and retrieval systems, and other types of material handling systems.

As shown in FIG. 1, sorter apparatus 10 includes a frame 18 that is adapted to moveably support a plurality of material support members or bodies. The bodies are connected together to form an endless web 12 that defines conveying surface 11 on which articles travel. The web of bodies may comprise of slats 20. A pusher shoe 26 is mounted around each slat 20 and is adapted to travel in a lateral direction. The lateral movement of pusher shoes 26 allows articles traveling on conveying surface 11 to be pushed off to one of sides and onto an adjacent takeaway conveyor or other structure (not shown) for further transportation to the article's final destination within a warehouse or other type of material handling facility. By selectively activating the shoes 26 at the appropriate times, the articles may be diverted onto the intended one of the plurality of takeaway conveyors. Sorter apparatus 10 thus functions as a sortation conveyor adapted to sort articles to their appropriate destination, and may be part of a larger material handling system that includes the takeaway conveyors, as well as additional conveyors feeding system 10 and other material handling structures.

The sorter apparatus 10 includes a charge end and a discharge end opposite charge end. The charge end receives articles from one or more feed conveyors (not shown). A conveying surface 11 moves the received articles towards the discharge end, and may deliver them to a recirculation conveyor if the pusher shoes 26 fail to divert the articles onto an adjacent takeaway conveyor or other structure. When slats 20 reach the discharge end, they are rotated downward to a lowered position where they then travel underneath the slats 20 that define conveying surface 11. In the lowered position, slats 20 travel in a direction opposite to direction of conveyance and return to the charge end. At the charge end, the slats 20 are rotated back to their elevated position for further transportation of articles in direction of conveyance. The path of slats 20 thus defines an endless loop.

Figure 2:
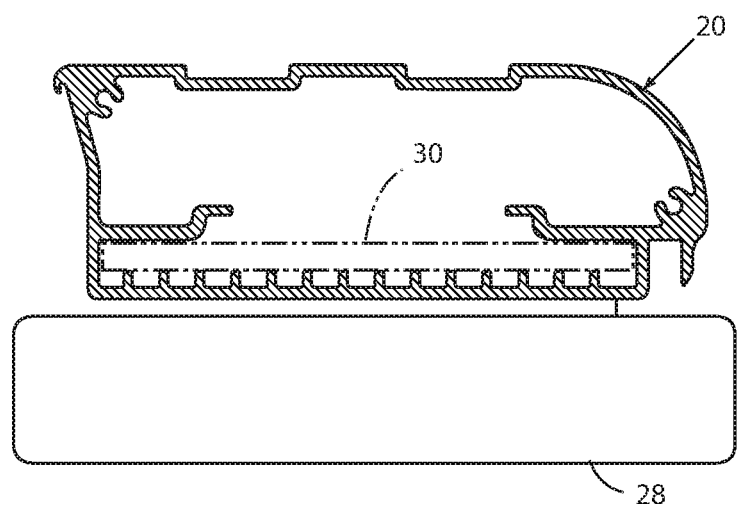
FIG. 2 is a sectional view taken along the lines II-II in FIG. 1 illustrating a linear motor primary and secondary within a slat.

A distributed drive system such as a linear motor propulsion system powers sorter apparatus 10 and moves slats 20 along the endless loop. As shown in FIG. 2, the linear motor propulsion system includes one or more stationary drives such as linear motor primaries 28 and a plurality of linear motor secondaries 32 at the slats 20. The linear motor secondaries 32 may include a magnet plate 30. Using magnetic fields produced by the linear motor primaries 28, linear motor secondaries 32 provide a thrust or propulsion tending to propel the endless web. As an example, further details of the construction and operation of linear motors in a sorter apparatus may be found in the commonly assigned U.S. Pat. No. 7,086,519 entitled POSITIVE DISPLACEMENT SHOE AND SLAT SORTER APPARATUS AND METHOD, the disclosure of which is hereby incorporated herein in its entirety by reference. Alternatively, the distributed drive system may include a plurality of distributed mechanical drives for propelling the slats such as disclosed in commonly assigned U.S. Pat. No. 8,813,943 entitled POSITIVE DISPLACEMENT SORTER, and in commonly assigned U.S. Pat. No. 9,499,346 entitled DISTRIBUTED SORTER DRIVE USING ELECTRO-ADHESION, the disclosures of which are hereby incorporated herein by reference.

Material handling systems such as sorter apparatus 10 are very large and complex systems that have a service life of many years. Over time, as parts wear and debris gathers in the system, maintenance is required in order to keep the system in proper working order. Such maintenance is most effective if provided to correct problems before failures occur. Such failures can lead to extended down-time for the system and compound the cost of repairs. However, determining when to conduct maintenance is difficult due to the limited accessibility of many components of the sorter apparatus 10. For example, linear motor primaries 28 are commonly disposed immediately underneath the conveying surface 11, and normally require a shutdown and partial disassembly of the sorter apparatus 10 in order to gain access to the primaries. In order to gather precise information for predictive maintenance during operation of the system and/or detect other latent faults, a modified slat assembly 50 is provided that includes a modified slat 51 and a diagnostic device 52. The modified slat 51 is generally the same as any of the unmodified slats 20 and are fitted with a fully functional pusher shoe 26 with the exception that the modified slat 51 includes any mounting or openings necessary for the installation and functioning of one or more diagnostic devices 52. While it is possible that one of the unmodified slats 20 may be removed and replaced with the modified slat assembly 50 (FIG. 3), in the illustrated embodiment, the modified slat assembly 50 is a permanent fixture in the sorter apparatus 10 or it may be removed after the information is gathered and replaced with an unmodified slat.

Figure 4:
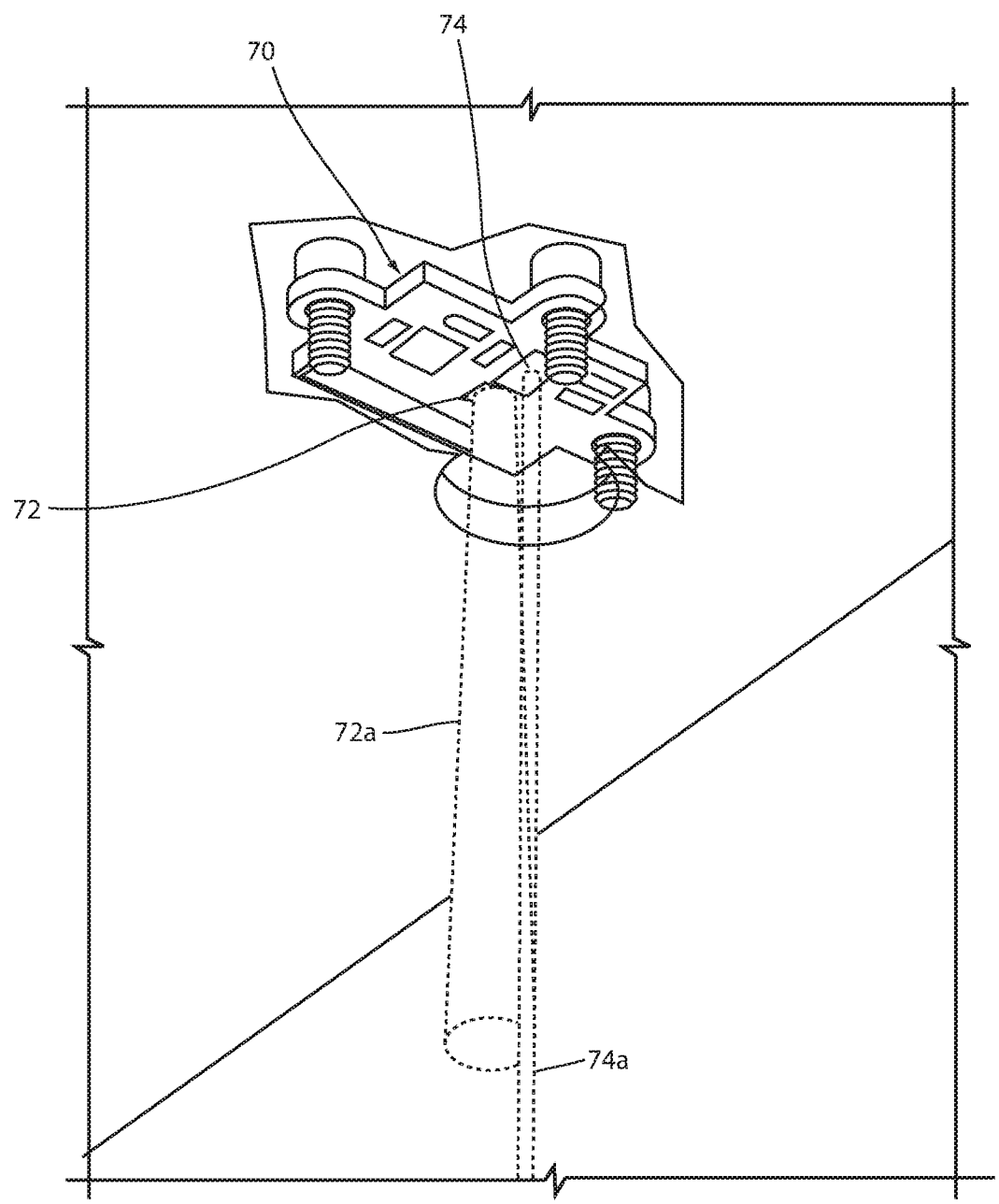
FIG. 4 is a perspective view of a first sensor of the diagnostic device.

The diagnostic device 52 includes at least one sensor 54 that travels with the web and may be adapted to detect at least one parameter of a linear motor primary 28 or other distributed drive. The sensor 54 may detect any manner of parameters of the linear motor primary 28 relevant to determining performance, predicting maintenance, or diagnosing faults. For example, the sensor 54 may detect the temperature of the linear motor primary 28 or sensor 54 may detect the distance of the primary from the sensor 54, which is proportional to the air gap between the linear motor primary 28 and linear motor secondary 32, or both parameters. In the illustrated embodiment, sensor 54 includes a first sensor assembly 70 (FIG. 4) that includes a contactless distance sensor 72 and a contactless temperature sensor 74. A contactless distance sensor 72 shown generating a beam 72*a* may, for example, use a laser known as a time-of-flight sensor to determine the distance to the linear motor primary 28. Such a sensor may be able to determine distance with a resolution of less than 1 millimeter. The distance between a linear motor secondary 32 and a linear motor primary 28 is of critical importance. A distance greater than optimal will decrease the effectiveness of the linear motor by decreasing the torque provided by the motor while a distance less than optimal will risk contact between the primary 28 and the secondary 32. A contactless temperature sensor 74 generates a beam 74*a* may, for example, use an infrared thermometer to detect the temperature of the linear motor primary 28. Such information is a direct indicator of the health of the linear motor primary or other distributed drive.

Figure 6:
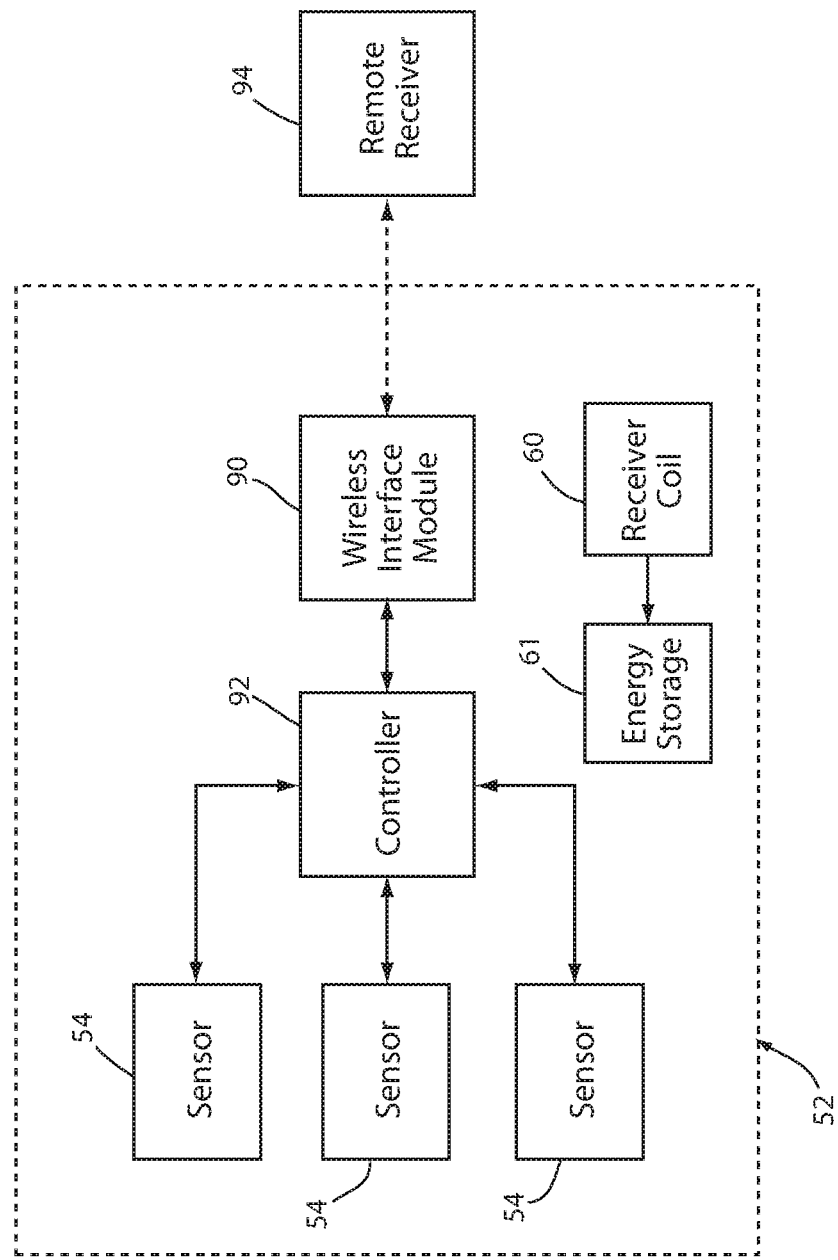
FIG. 6 is a block diagram of an electronic circuit of a diagnostic device.

As shown in FIG. 6, the diagnostic device 52 also includes a controller 92 that is adapted to receive the parameters from the at least one sensor 54. The controller 92, for example, may be a processor, a microprocessor, a Field Programmable Gate Array (FPGA), or the like. The controller 92 may conduct analysis, compression, or other manipulation of the parameters. The controller 92 may configure or adjust the sensors as necessary to acquire relevant data. The diagnostic device 52 may also include an energy harvesting system such as a field receiver coil such as an inductive pickup 60 that is adapted to receive power wirelessly through electromagnetic induction from the magnetic field produced by the linear motor primaries 28. The energy harvesting system allows for the wireless reception of power. This provides power to enable the domestic device 52 to carry out its functions without needing to replace power storage device 61 with a pre-charged storage device. In this way, the diagnostic device 52 can be permanently placed within the sorter apparatus 10. The conductive pickup 60 may be of any conductive material, such as copper. The conductive pickup 60 may include a coil of conductive material. The magnetic field produced by the linear motor primary 28 may pass through coil and induce a voltage, which in turn creates current in the coil. The conductive pickup 60 may be combined with an energy storage device 61, such as a supercapacitor or a battery. The energy storage device 61 may provide power to the diagnostic device 52, and allow for continued operation even when not receiving power directly from a linear motor primary 28 such as when sorter apparatus 10 is not in operation. The energy storage device may be pre-charged before installation into the sorter apparatus in order to provide initial power.

Other energy harvesting techniques that are powered through movement of endless web 12 include a dynamo driven from one of wheels 76 that moveably support endless web 12. The main body of the dynamo can be mounted to slat 51 and drivenly connected with one of wheels 76 supporting that slat. Still other energy harvesting techniques do not need movement of endless web 12 for their operating. Examples of such other energy harvesting techniques include power-cast systems which wirelessly transmits power over radio frequency channels for far filed over-the-air charging.

Figure 5:
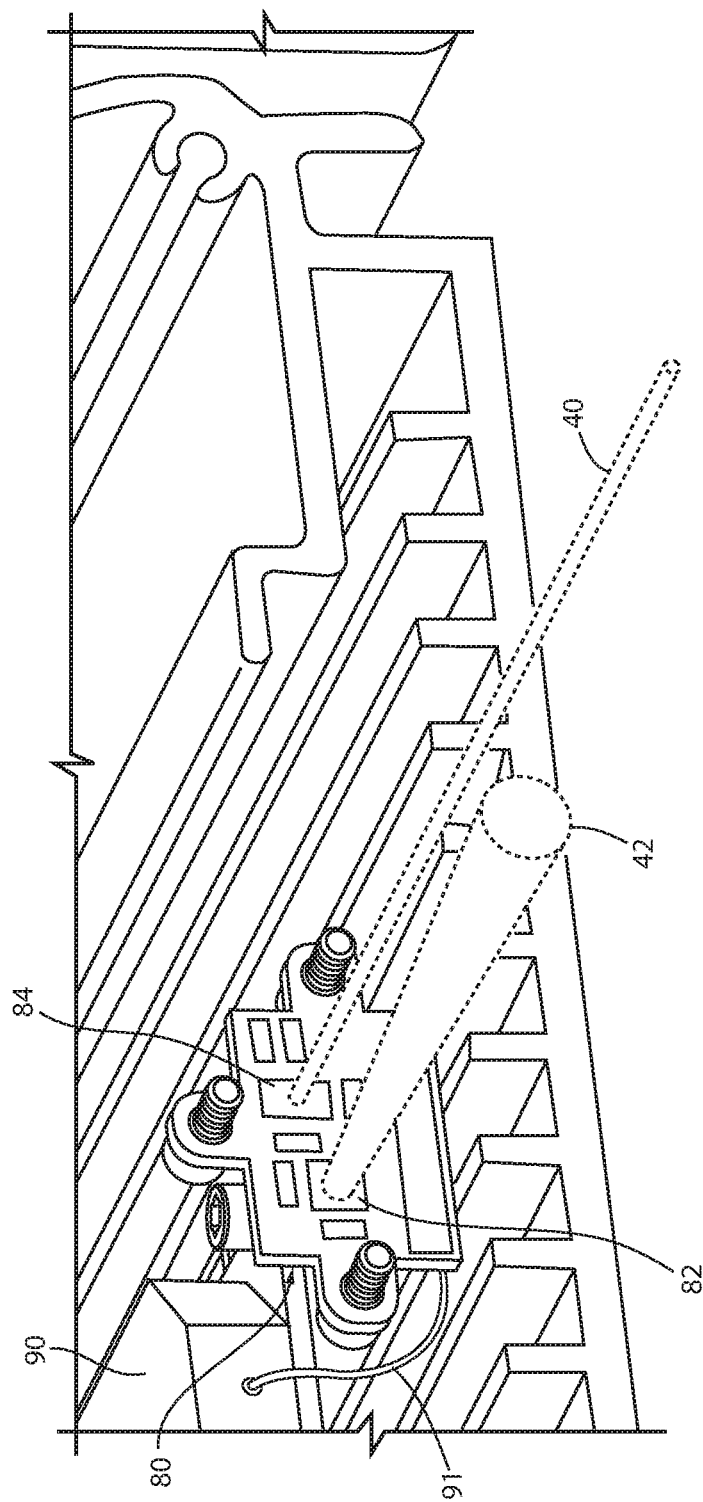
FIG. 5 is a perspective view of a second sensor of the diagnostic device.

The diagnostic device may include a wireless interface module 90 that is adapted to receive data from the controller 92 and wirelessly exchange data with a remote receiver 94. The wireless interface module 90 may use any appropriate wireless technology to communicate with the remote receiver 94, such as Wi-Fi or Bluetooth or the like. The wireless interface module 90 may connect directly with the remote receiver 94, or alternatively the wireless interface module 90 may connect through an intermediary, such as a router, switch, or hub. Additionally, the diagnostic device 52 may include local data storage device, or memory, to store data locally until such a time the data is retrieved from the diagnostic device 52 or until the wireless interface module 90 is prepared to transmit the data. Such storage could be in any appropriate form, such as non-volatile memory or the like. An antenna 91 may be provided with the wireless interface module 90 to increase the effectiveness of the wireless communication. Because modified slat 51 may be made from an extruded metal and thereby act as a Faraday cage or shield, antenna 91 may be positioned at an open end of the slat 51 such as outside of any wheel assembly plate enclosing the slat (FIG. 5).

The remote receiver 94 may be any appropriate device capable of communicating wirelessly, such as a computer, laptop, tablet, or mobile phone. The remote receiver may be capable of doing advanced statistical analysis of the diagnostic data to diagnose or predict faults or maintenance needs in the sorter apparatus 10. Such statistical analysis may include using historical data from the sorter apparatus 10 or historical data from other sorter apparatuses. The remote receiver 94 may be capable of remote monitoring of the diagnostic data and alerting users when certain thresholds are reached or other anomalies are detected in the data. In this way, maintenance needs can be predicted and faults can be diagnosed with minimal downtime required of the sorter apparatus 10. Remote receiver 94 may be a component in a warehouse or sortation system management system and may be able to take autonomous corrective action such as shutting down the sorter to avoid a fault damaging the sorter apparatus.

Figure 7:
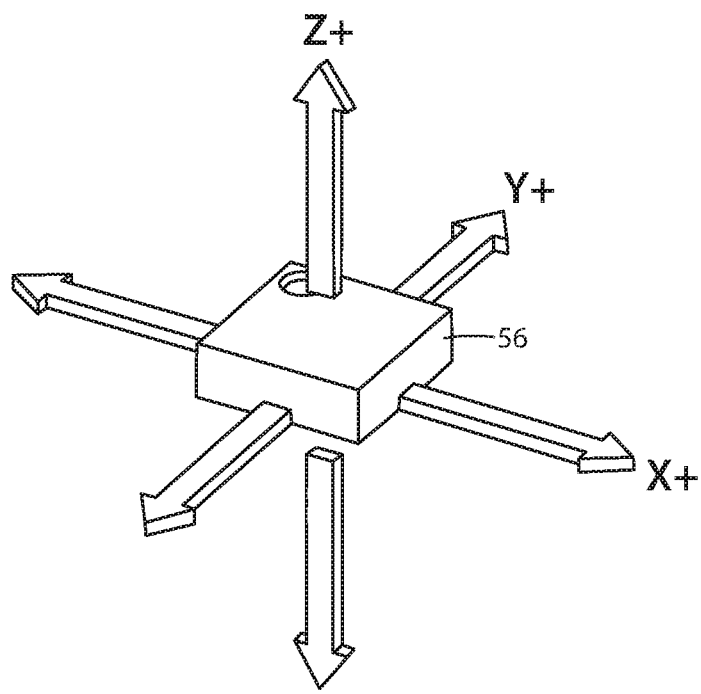
FIG. 7 is a three dimensional diagram illustrating sensing capability of an acceleration sensor.
Figure 8:
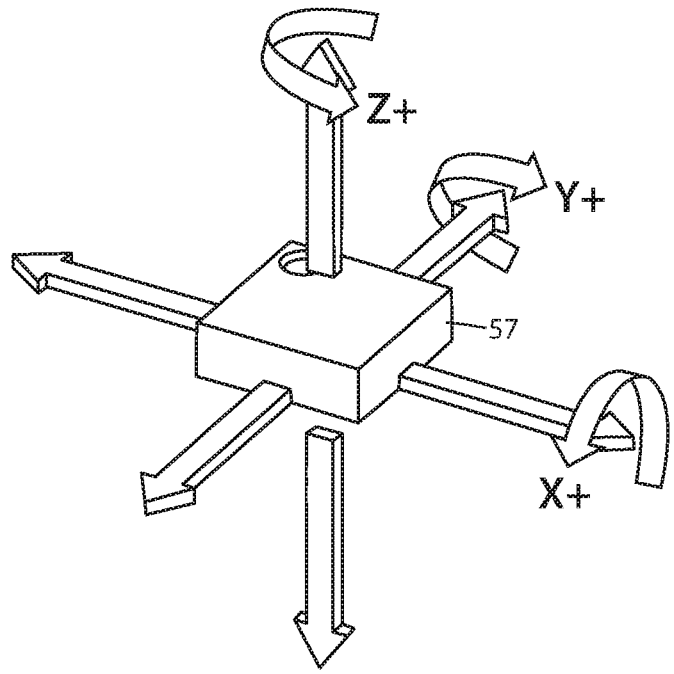
FIG. 8 is a three dimensional diagram illustrating sensing capability of a gyroscope sensor.

The diagnostic device 52 may include several other sensors 54. For example, the diagnostic device 52 may include an acceleration sensor, such as an accelerometer 56 that is adapted to detect the acceleration of the sensor in three orthogonal axis X, Y, and Z as it travels with the endless web as illustrated in FIG. 7. The acceleration data can be passed through a digital signal processor to determine frequency of acceleration of the modified slat or can be used in longer term averages to determine inclination at the system level. The diagnostic device 52 may include a rotation sensor such as a gyroscope 57 that is adapted to detect the rotation of the sensor in three orthogonal axis X, Y, and Z as it travels with the endless web as illustrated in FIG. 8. A common form of such a rotation sensor is a digital gyroscope, but other types may be used. The rotation data may be combined with acceleration data produced by sensor 56 to provide robust and accurate direction and motion detection and rotational vibration. Furthermore, using well known mathematics, the rotation data can be used to determine average and relative speed as the rotation sensor passes through known points, such as the charge and discharge ends of the sorter apparatus 10.

Figure 3:
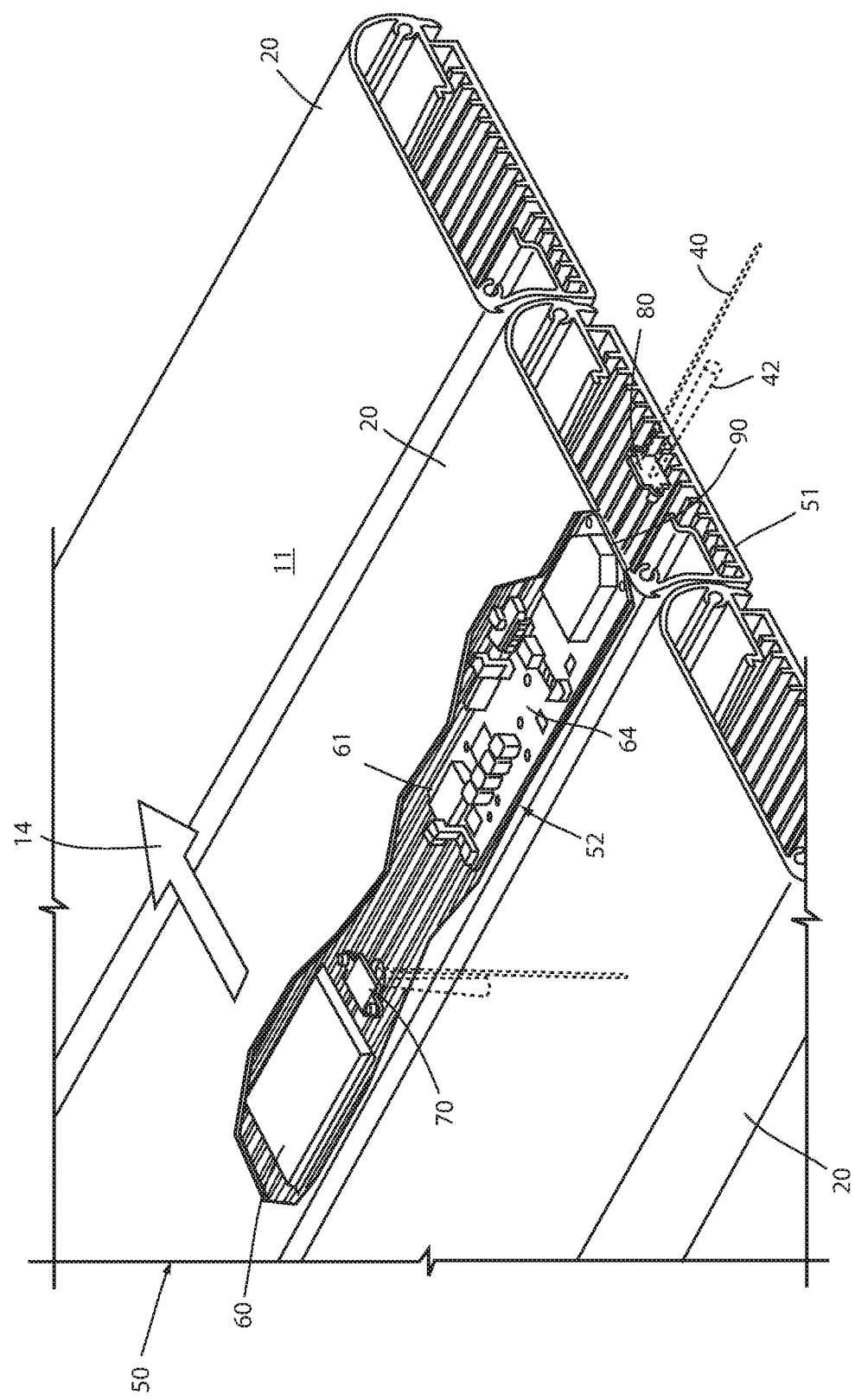
FIG. 3 is a perspective view of a the endless web with a portion of a slat removed in order to reveal a diagnostic device.
Figure 9:
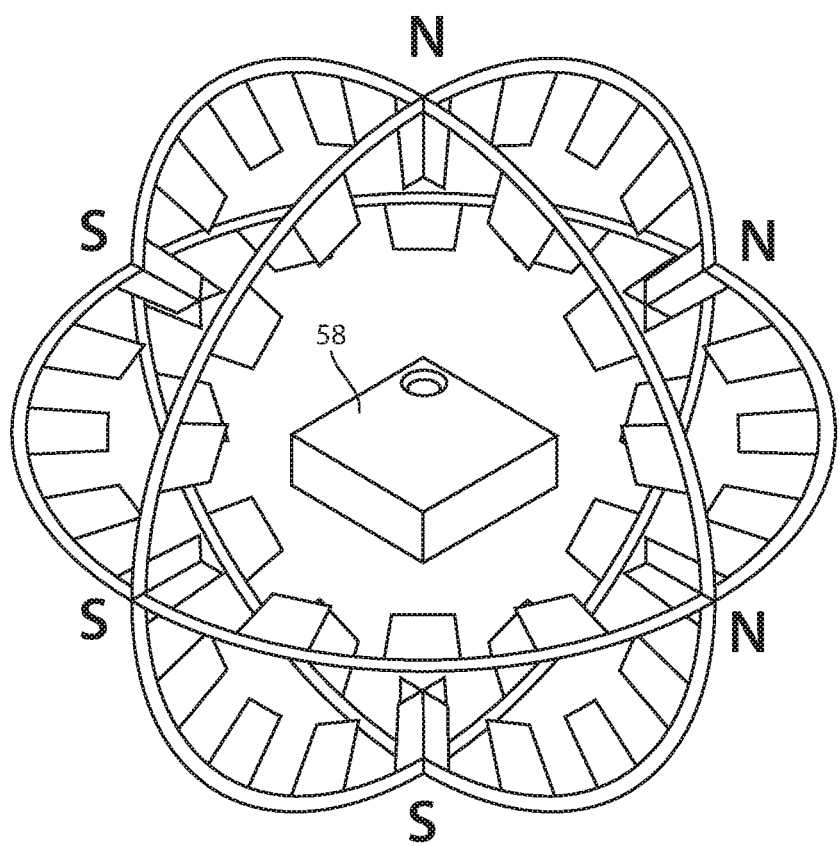
FIG. 9 is a three dimensional diagram illustrating sensing capability of a magnetic field sensor.
Figure 10:
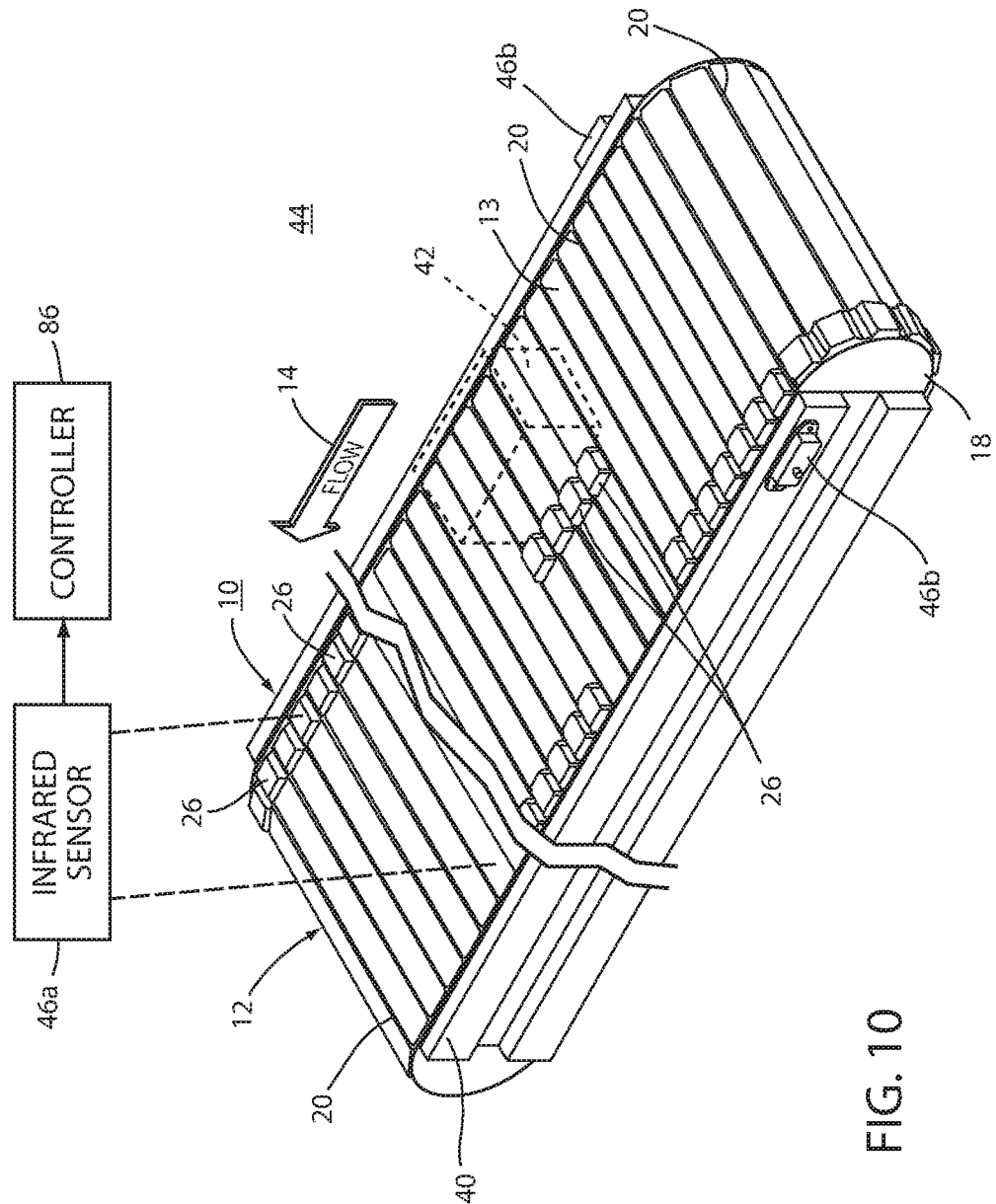
FIG. 10 is a perspective view of a sorter apparatus according to another embodiment.
Figure 11:
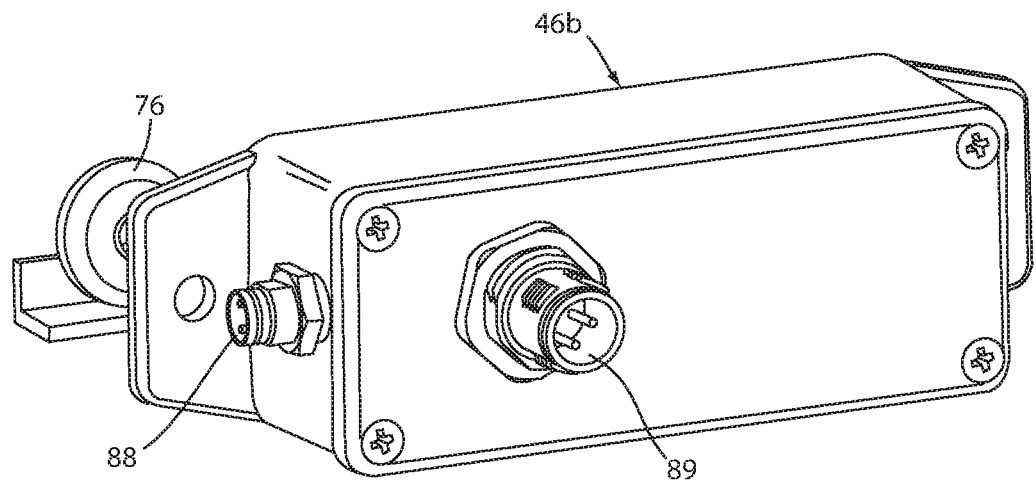
FIG. 11 is a perspective view of a stationary infrared sensor.

Further, the diagnostic device 52 may also include a magnetism sensor, such as a magnetometer 58 that is adapted to detect magnetic fields surrounding the magnetism sensor in three orthogonal north (N) south (S) planes as the magnetism sensor travels with the endless web as illustrated in FIG. 9. Magnetism data could be used to detect the orientation and heading of the sensor and thereby the location of modified slat 51 on the endless loop. In particular, the signals produced by a magnetism sensor could be used to determine if the modified slat 51 is on the top or bottom of the sorter apparatus 10 or shifts in heading due to mechanical errors. Magnetism data could also be used to measure the strength and direction of the magnetic fields produced by the linear motor primaries 28 or the presence of any local magnetic fields that are distorting earth's magnetic field. In the illustrated embodiment, as shown in FIG. 3, the diagnostic device 52 combines the acceleration sensor 56, rotation sensor 57, and magnetism sensor 58 into a single inertial measurement unit (IMU) 64. The IMU 64 combines such sensors to provide highly accurate and sensitive position measurements.

The sorter apparatus 10 may include one or more stationary lateral surfaces adjacent to the endless web of bodies to prevent excessive lateral motion of the web. The diagnostic device 52 may include a second sensor 80 adapted to measuring a distance between the distance sensor and one of the plurality of stationary surfaces and positioned at one of the bodies of the endless web of bodies. This measurement can help alert a user if the modified slat 51 fails to maintain a uniform distance from the stationary surface as the modified slat 51 travels along the web. As shown in FIG. 5, second sensor assembly 80 that further includes a contactless distance sensor 82 and a contactless temperature sensor 84. Similar to the first sensor assembly 70, the second sensor assembly generates a thermal detection beam 40 detects the temperature and a time-of-flight beam 42 to detect the distance of the adjacent stationary surface.

The diagnostic device 52 disclosed herein has many uses. As noted, it may be a permanent auditing tool in order to monitor the sorter apparatus 10 over its service life. The data can be continuously collected, recorded, and compared as the system ages. The diagnostic device 52 may be used to gather data to compare to other systems. It may also be used as an installation tool. In such an application, the device is applied to the sorter apparatus after installation in order to verify that the system meets installation specifications as well as to diagnose the nature of any deviation from such specifications. Because sorter apparatuses are often relied upon to be operational with little down time, predicting maintenance and diagnosing faults or degradation in performance is highly beneficial.

Diagnostic device 52 and sensor 54 may be part of a thermal hotspot detection system 44 that includes device 52 and sensor that travel with web 12 and at least one stationary thermal sensor such as an infrared sensor 46a, 46b that senses thermal hotspots as the hotspot travels past the stationary sensor. Stationary thermal sensor 46a is an infrared camera mounted spaced from endless web 12 and monitoring the endless web as it travels. Sensor 46a is particularly focused at opposite lateral sides of the endless web as this is how the web is supported. For example, endless web 12 is supported by wheels or bearings 76 which are supported by a track. If a wheel or bearing becomes frozen it will generate heat which will be sensed by sensor 46a. Sensor 46a is operative with another controller 86 which adapted to receive thermal data from the stationary thermal sensor. Controller 86 may coordinate with another controller which provides overall control for sorter apparatus 10 in order to correlate a sensed hotspot with a portion of the endless loop. Each slat 20 is uniquely numbered so that the hotspot can be correlated with that slat so the wheel or bearing can be identified and replaced.

Figure 12:
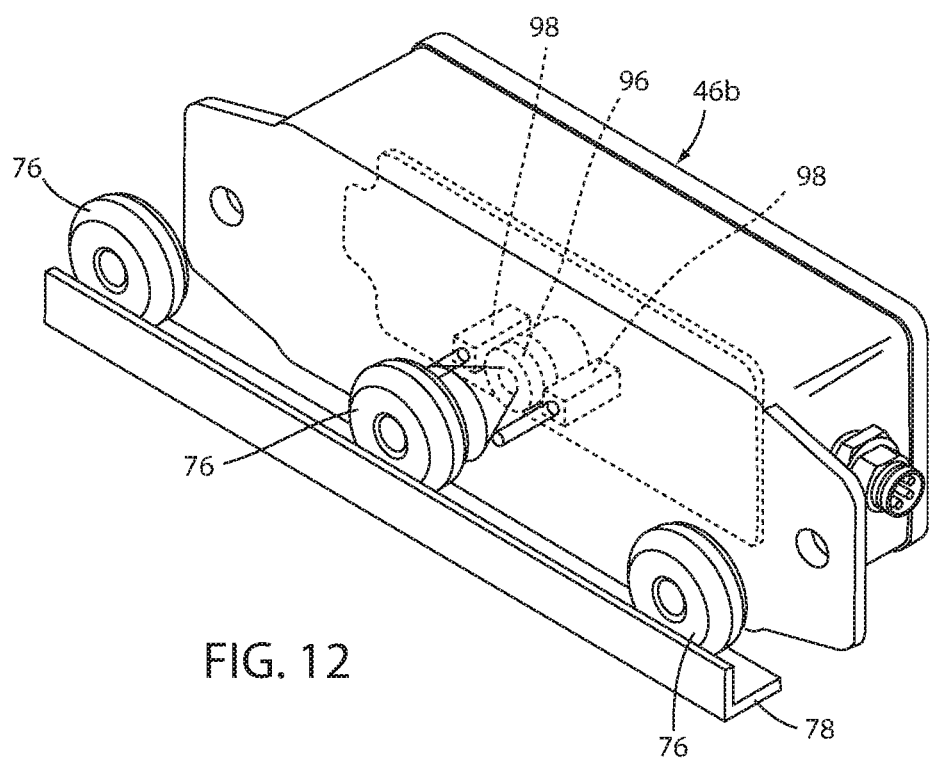
FIG. 12 is a perspective view of the stationary infrared sensor in FIG. 11 taken from the direction XII-XII in FIG. 11.
Figure 13:
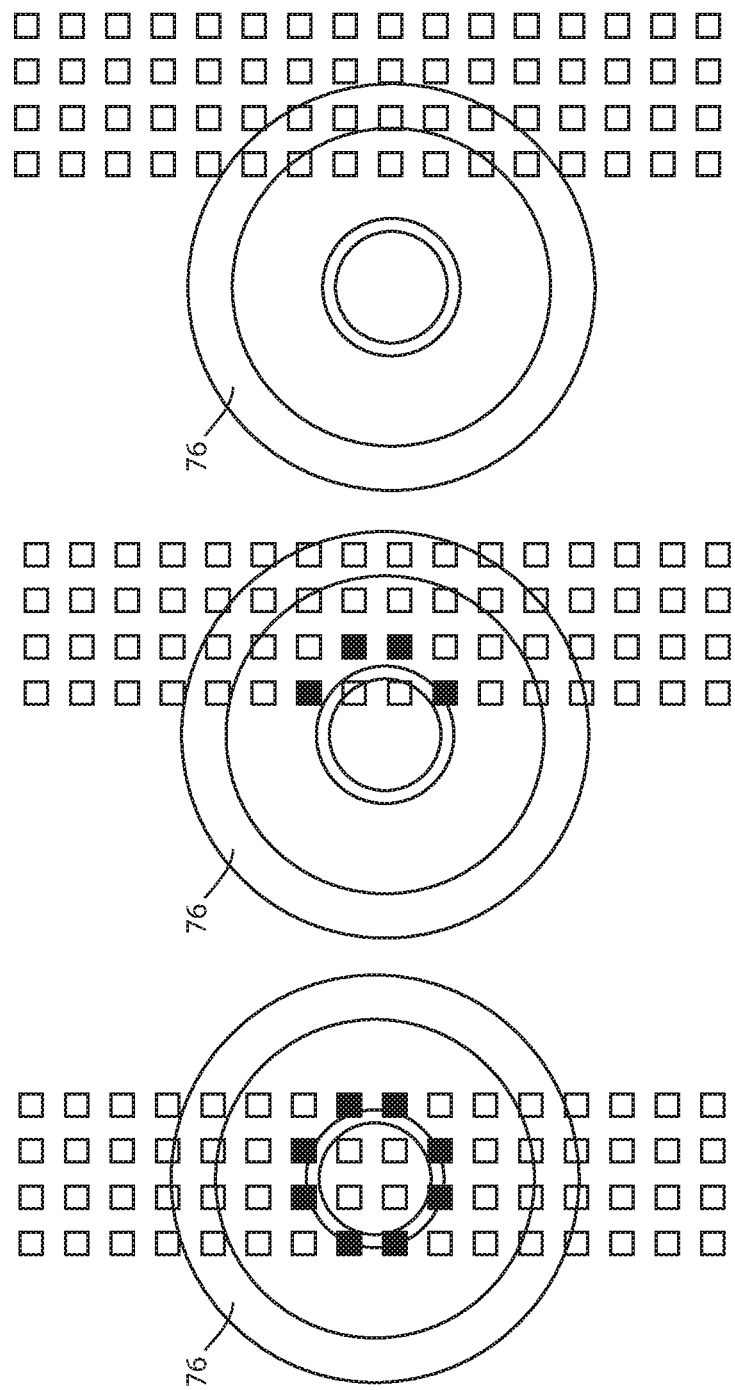
FIG. 13 is an illustration of thermal sensing pixels of bearings passing the infrared sensor in FIGS. 11 and 12.
Figure 14A:
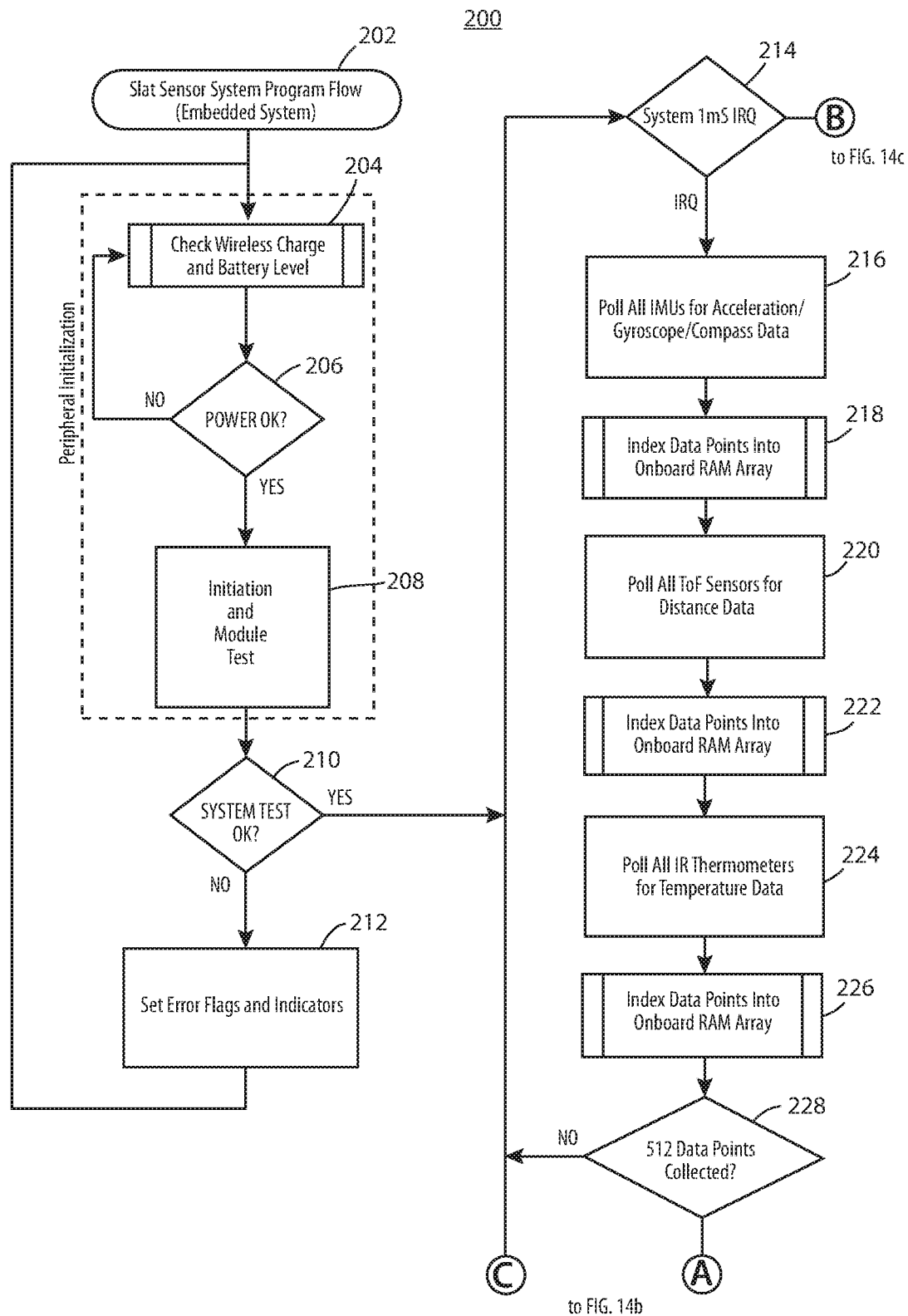
FIGS. 14a-14c are a logic flow diagram of a program according to an embodiment of the invention.
Figure 14B:
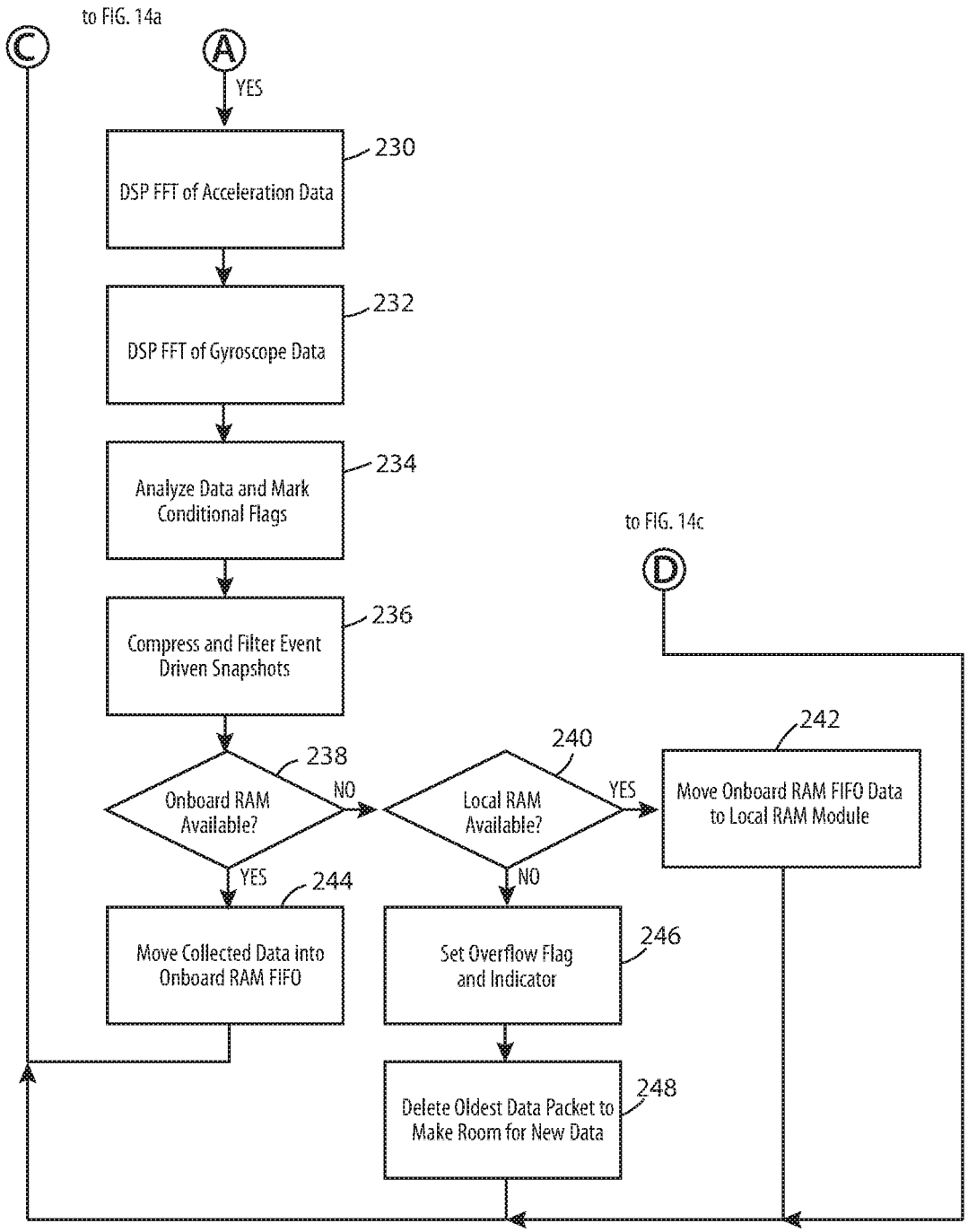
Figure 14C:
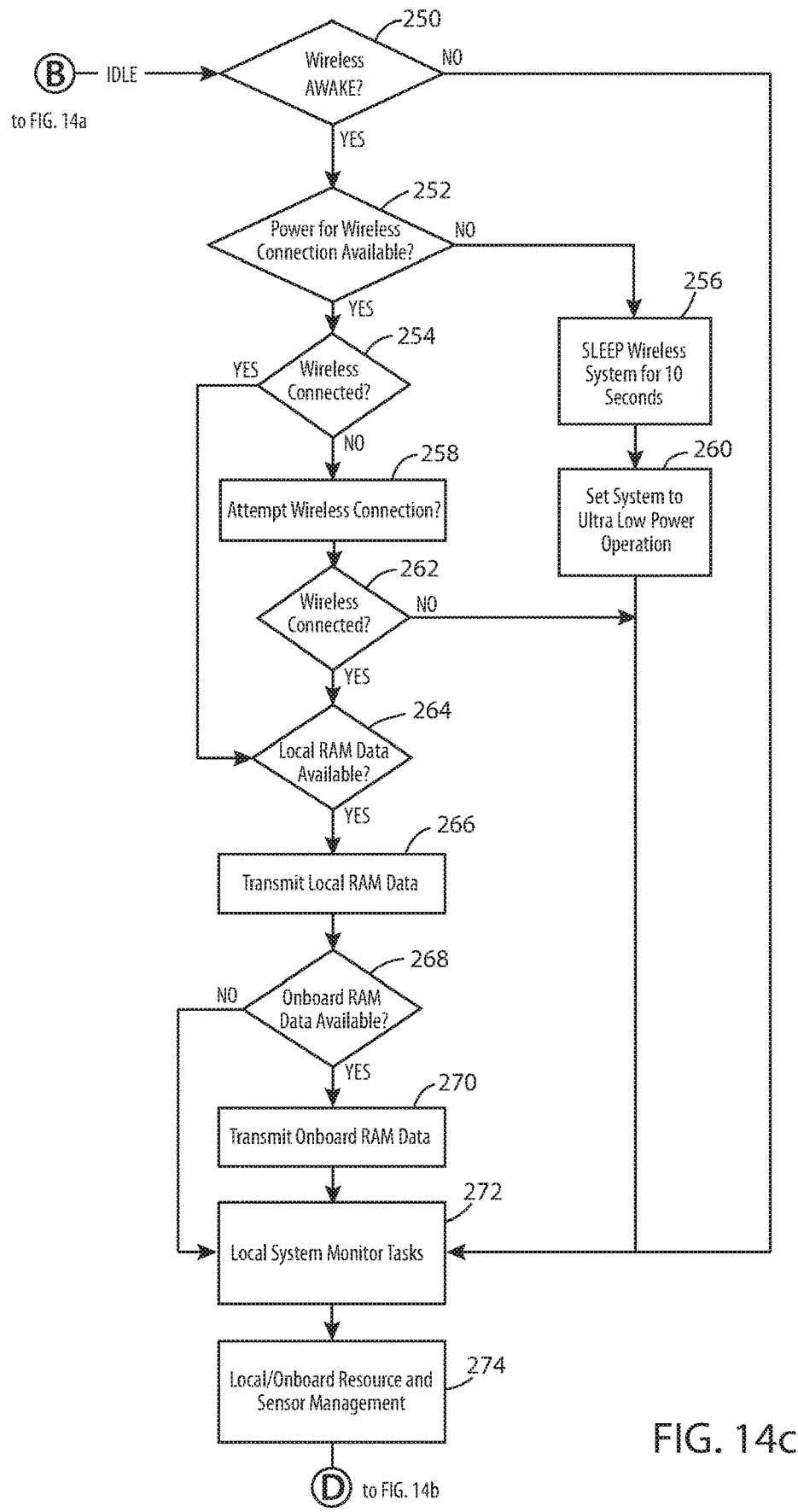

Stationary infrared sensors 46b are mounted directly to frame 18 at the level of a tract 78 that supports wheels or bearings 76. In that manner, wheels or bearings 76 pass directly past sensors 46b during operation of the sorter apparatus. An infrared temperature sensor 96 in the illustrative embodiment is a 4×16 sensor array that makes 500 samples per second thereby allowing high speed temperature evaluation of moving objects, namely wheels or bearings 76. The output of temperature sensor 96 is supplied to an internal controller, such as a microprocessor for processing. An infrared sensor 46b is provided on each side of frame 18 in order to monitor the wheels or bearings supporting that lateral side of endless web 12. Sampling of the temperature of wheels or bearings 76 as they pass temperature sensor 96 is illustrated in FIG. 12. Proximity sensors 98 on opposite sides of temperature sensor 96 provide triggering points along with relative speed calculations of wheels or bearings 76. This allows for a reduction of excess data as the system can capture points of interest and ignore spaces between desired captures. A digital interface 88 supplies operating voltage as well as a digital output and digital input such as from external photo sensors or the like. An Ethernet interface 89 provides high speed transfer of thermal information both locally and remotely via cloud services which can be used by the warehouse of sorter apparatus controller to match hotspot readings with particular wheels or bearings or at least the slat 20 having the failed wheel or bearing.

A diagnostic program 200 residing on controller 92 is initiated at 202 by checking at 204 the power level of energy storage device 61 and, if determined at 206 to be adequate, begins an initiation and testing routine at 208. If it is determined at 210 to be ready for operation then the program enters into an operational loop. If not, error flags and indicators are sent at 212.

In the operational loop, an interrupt request (IRQ) is triggered periodically such as every millisecond. When it is determined at 214 that an IRQ is triggered, all sensors 54, 56, 57, and 58 are polled at 216 and the data loaded into a memory array at 218. Distance sensors 72 and 82 are polled at 220 and recorded at 222 and IR sensors 74 and 84 are polled at 224 and recorded at 226. When it is determined at 228 that all data has been collected, a Fast Fourier Transform (FFT) is performed at 230 for the data from accelerometer 56 and at 232 for rotational sensor 57. The quality of the FFT is indicated at 234 and the data is compressed at 236.

It is determined at 238 if onboard RAM is available and, if so, the compressed data is transferred to the available RAM at 244. If onboard RAM is not available, then it is determined at 240 if local RAM is available in remote received 94. If so, the data is transferred at 242. If not then a failure flag is set at 246 and oldest data deleted at 248 to make room for new data.

If it is determined at 214 that the program is in an idle interval between interrupt requests, a determination is made at 250 if the wireless interface 90 is awake. If so, power availability is checked at 252 and it is determined at 254 if a wireless connection is established. If not a wireless connection is attempted at 258. If it is determined at 252 that sufficient power is not available, the wireless system is put to sleep at 256 in order to allow storage device 61 to become adequately charged and the system set to ultralow power operation mode at 260. When it is determined at 262 that a wireless connection is made, local RAM and onboard RAM are transferred at 266, 270, and 272. The system then returns to 214 to again determine whether the system is generating an IRQ or staying in idle mode.

Changes and modifications in the specifically described embodiments can be carried out without departing from the principles of the invention. For example, the figures depict a combined acceleration, rotation, and magnetic sensor. However, these sensors could be separate or in different combinations to achieve the same result. The figures also depict a combined temperature and distance sensor into a time-of-flight sensor. Again, these sensors could be found in other arrangements in order to achieve the desired result. The invention may be a permanent fixture in the sorting apparatus, but it may also be removed when diagnosis is complete. The invention is intended to be limited only by the scope of the appended claims, as interpreted according to the principles of patent law including the doctrine of equivalents.

The embodiments of the invention in which an exclusive property or privilege is claimed are defined as follows:

1. A method of sorting articles with a sorter having a conveying surface that is adapted to transport articles in a direction of conveyance and a mechanism adapted to displace articles on the conveying surface, the sorter having an endless web of bodies travelling in an endless loop defining the conveying surface and a distributed drive system having a plurality of spaced apart stationary distributed drives that are adapted to produce a thrust force with the bodies to propel the endless web, the method comprising:

monitoring operation of the sorter with a diagnostic device traveling with the web and positioned at one of the bodies of the endless web, the diagnostic device having a sensor positioned to be facing one of said drives when said one of said bodies is proximate to that drive to detect at least one parameter of that drive, the at least one parameter comprising at least one chosen from determining performance, predicting maintenance and diagnosing a fault of said sorter.

2. The method as claimed in claim 1, wherein distributed drive system comprises a linear motor system and wherein each of said drives comprises at least one stationary linear motor primary that is adapted to produce a magnetic field to provide a thrust force in a linear motor secondary with one of the bodies to propel the endless web.

3. The method as claimed in claim 2, wherein the at least one parameter comprises a temperature of the one of said linear motor primaries that is proximate to the at least one sensor.

4. The method as claimed in claim 2, wherein the at least one parameter further comprises a separation distance between the diagnostic device and the proximate linear motor primary.

5. The method as claimed in claim 1, wherein the at least one sensor comprises an acceleration sensor and said method further including detecting acceleration as the acceleration sensor travels with the endless web.

6. The method as claimed in claim 1, wherein the at least one sensor comprises a magnetism sensor and wherein said method further includes detecting magnetic fields surrounding the magnetism sensor as the magnetism sensor travels with the endless web.

7. The method as claimed in claim 1, wherein said sorter further comprising at least one stationary surface adjacent a lateral edge portion of the endless web of bodies and wherein the at least one sensor further comprises a distance sensor positioned at an end of one of the bodies and said method further includes measuring with the distance sensor a distance between the distance sensor and the at least one stationary surface.

8. The method as claimed in claim 7, wherein the bodies comprise slats.

9. The method as claimed in claim 1, including further monitoring the endless loop with a stationary thermal sensor, including receiving thermal data with the stationary thermal sensor and correlating the thermal images with a portion of the endless loop.

10. The method as claimed in claim 9, including determining which one or ones of the bodies correlate with any thermal image thereby identifying a thermal hot spot.

11. The method as claimed in claim 9, wherein said endless loop is supported at opposite lateral end portions and wherein said stationary thermal sensor is directed at one of said lateral end portions of said endless loop.

12. A method of sorting articles with a sorter having a conveying surface that is adapted to transport articles in a direction of conveyance and a mechanism adapted to displace articles on the conveying surface, the sorter having an endless web of bodies travelling in an endless loop defining the conveying surface and a distributed drive system having a plurality of spaced apart stationary drives that are adapted to produce force with the bodies to propel the endless web, wherein the distributed drive system comprises a linear motor system and wherein said drives comprise stationary linear motor primaries that are adapted to produce a magnetic field to provide force in a linear motor secondary that is with one of the bodies, the method comprising:

monitoring operation of the sorter with a diagnostic device traveling with the web and positioned within one of the bodies of the endless web, the diagnostic device having a sensor positioned to be facing one of said linear motor primaries when said one of said bodies is proximate to that linear motor primary to detect at least one parameter of that linear motor primary, wherein the diagnostic device further comprises a wireless interface module and wirelessly transmitting the data to a remote receiver with said wireless interface module; and receiving power with an inductive pickup device positioned at said one of said bodies through electromagnetic induction from the magnetic field produced by that linear motor primary and providing the received power to the diagnostic device, wherein the bodies are made from cylindrical extruded metal thereby defining a Faraday cage and wherein the wireless interface module further comprises an antenna positioned adjacent an open end of one of the bodies to thereby reduce Faraday shield effect of the body on the antenna.

13. The method as claimed in claim 12, wherein the wirelessly transmitting using Wi-Fi to wirelessly transmit the diagnostic data to the remote receiver.

14. The method as claimed in claim 13, including analyzing received diagnostic data with the remote receiver and identifying a possible fault condition based at least in part on comparing received diagnostic data to at least one of a corresponding threshold or to historical data.

15. The method as claimed in claim 13, wherein the diagnostic device further comprises a data storage module including storing data with the data storage module until the wireless interface module wirelessly transmits the diagnostic data to the remote receiver.

16. The method as claimed in claim 12, wherein the at least one parameter comprises a temperature of that linear motor primary.

17. The method as claimed in claim 12, wherein the at least one parameter further comprises a separation distance between the diagnostic device and that linear motor primary.

18. The method as claimed in claim 12, wherein the at least one sensor comprises an acceleration sensor and said method further including detecting acceleration as the acceleration sensor travels with the endless web.

19. The method as claimed in claim 12, wherein the at least one sensor comprises a magnetism sensor and wherein said method further includes detecting magnetic fields surrounding the magnetism sensor as the magnetism sensor travels with the endless web.

20. The method as claimed in claim 12, wherein said sorter further comprising at least one stationary surface adjacent a lateral edge portion of the endless web of bodies and wherein the at least one sensor further comprises a distance sensor positioned at an end of one of the bodies and said method further includes measuring with the distance sensor a distance between the distance sensor and the at least one stationary surface.

* * * * *